United States Patent
Inoue

(10) Patent No.: US 6,740,296 B1
(45) Date of Patent: May 25, 2004

(54) AUTOMATED CHEMICAL SYNTHESIZER AND METHOD FOR DETECTING LIQUID SHORTAGES IN THE SAME

(75) Inventor: Takaaki Inoue, Moriyama (JP)

(73) Assignee: Shimadzu Corporation, Nakagyo-ku (JP)

(*) Notice: Subject to any disclaimer, the term of this patent is extended or adjusted under 35 U.S.C. 154(b) by 0 days.

(21) Appl. No.: 09/492,451

(22) Filed: Jan. 27, 2000

(30) Foreign Application Priority Data

Feb. 4, 1999 (JP) .......................................... 11-027321

(51) Int. Cl.$^7$ ................................................. G05D 9/00
(52) U.S. Cl. ...................... 422/106; 422/100; 422/105; 422/130; 436/55; 436/180
(58) Field of Search .......................... 422/99, 100, 102, 422/105, 106, 107, 112, 129, 130, 131; 436/43, 50, 55, 180; 73/863, 863.01

(56) References Cited

U.S. PATENT DOCUMENTS

| | | | | |
|---|---|---|---|---|
| 5,252,296 A | * | 10/1993 | Zuckermann et al. | 422/116 |
| 5,389,339 A | * | 2/1995 | Petschek et al. | 422/64 |
| 5,551,309 A | * | 9/1996 | Goossens et al. | 73/863 |
| 5,879,628 A | * | 3/1999 | Ridgeway et al. | 422/73 |
| 5,902,927 A | * | 5/1999 | Titus | 73/30.02 |
| 6,190,619 B1 | * | 2/2001 | Kilcoin et al. | 422/131 |
| 6,264,891 B1 | * | 7/2001 | Heyneker et al. | 422/64 |
| 6,395,235 B1 | * | 5/2002 | Kilcoin et al. | 422/103 |
| 6,472,218 B1 | * | 10/2002 | Stylli et al. | 436/48 |

* cited by examiner

Primary Examiner—Jill Warden
(74) Attorney, Agent, or Firm—Oblon, Spivak, McClelland, Maier & Neustadt, P.C.

(57) ABSTRACT

An automated chemical synthesizer including plural reaction vessels, a plurality of liquid containers, at least one liquid dispenser, a liquid amount storage, a dispensing amount calculator, and a liquid shortage detector. The plurality of liquid containers are configured to contain liquid chemicals respectively. The at least one liquid dispenser is configured to dispense the liquid chemicals from the plurality of liquid containers to the plural reaction vessels according to a synthesizing protocol. The liquid amount storage is configured to memorize a present amount of each of the liquid chemicals in the plurality of liquid containers. The dispensing amount calculator is configured to calculate a dispensing amount of each of the liquid chemicals to be dispensed according to the synthesizing protocol. The liquid shortage detector is configured to detect shortages of the liquid chemicals in the plurality of liquid containers by comparing the present amount memorized in the liquid amount storage and the dispensing amount calculated by the dispensing amount calculator.

21 Claims, 13 Drawing Sheets

| α (Large Use Amount Reagent) | |
|---|---|
| Position Address | Present Amount |
| (A, 1) | |
| (A, 2) | |
| ... | ... |
| (B, 3) | |

| β (Small Use Amount Reagent) | |
|---|---|
| Position Address | Present Amount |
| (A, 1) | |
| (A, 2) | |
| ... | ... |
| (D, 9) | |

| γ (Solvent) | |
|---|---|
| Position Address | Present Amount |
| (A, 1) | |
| (B, 1) | |
| (C, 1) | |
| (D, 1) | |

FIG. 10
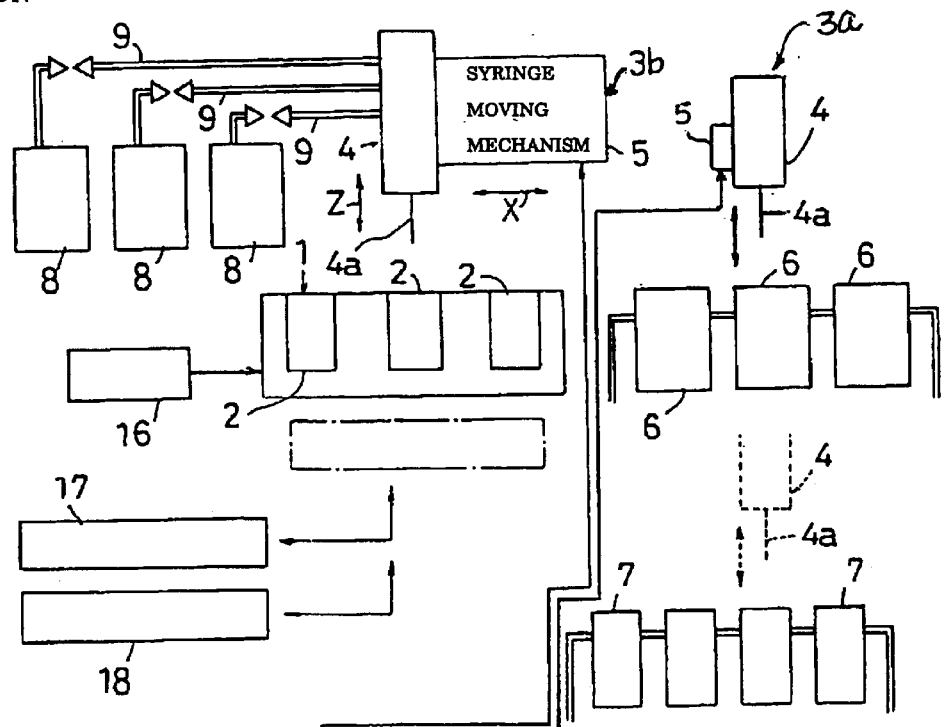
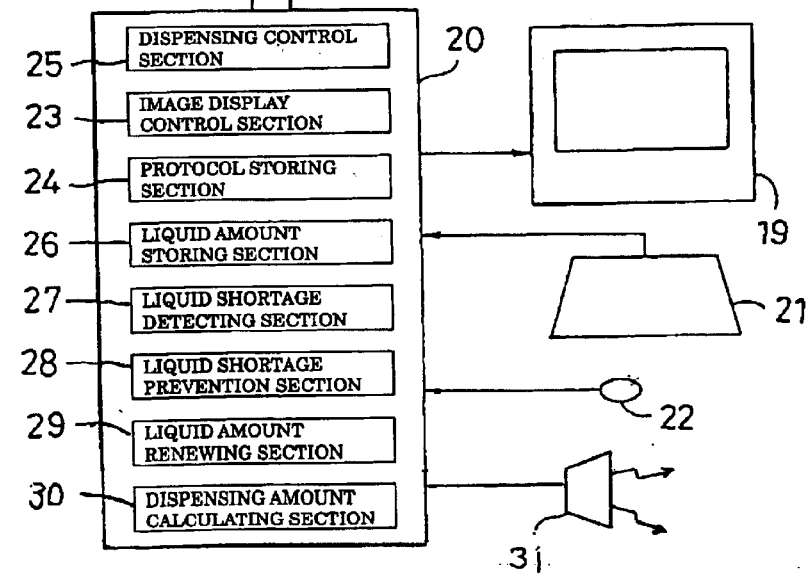

AUTOMATED CHEMICAL SYNTHESIZER AND METHOD FOR DETECTING LIQUID SHORTAGES IN THE SAME

CROSS-REFERENCE TO RELATED APPLICATIONS

The present application claims priority under 35 U.S.C. § 119 to Japanese Patent Application No. 11-27,321, filed Feb. 4, 1999, entitled "Automated Synthesizing Apparatus." The contents of that application are incorporated herein by reference in their entirety.

BACKGROUND OF THE INVENTION

1. Field of the Invention

The present invention relates to an automated chemical synthesizer. Further, the present invention relates to a method for detecting a liquid shortage in the automated chemical synthesizer.

2. Description of the Background

Automated chemical synthesizers have been used for research in the fields of pharmaceutical, life science, chemistry and material science among others.

FIG. 12 shows a conventional automated chemical synthesizer. Referring to FIG. 12, the automated chemical synthesizer has a syringe 53 and a reaction block 51 which includes multiple reaction vessels 52 in which synthetic reactions take place. The syringe 53 dispenses liquid chemicals, i.e., solvents and reagents to each reaction vessel 52 according to a dispensing procedure of a synthesizing protocol. In the automated chemical synthesizer, an operator sets reagent and solvent containers next to the reaction block 51. The syringe 53 dispenses solvents and reagents from the reagent and solvent containers to each reaction vessel 52.

However, in this automated chemical synthesizer, shortages of the reagents or solvents in the containers may occur. An operator generally sets reagent and solvent containers which contain enough amount of reagents and solvents according to the synthesizing protocol. However, it is time-consuming to calculate the dispensing amounts with respect to all liquid chemicals and sometimes the operator may make mistakes.

If the shortages of the reagents or solvents occur, the automated chemical synthesizer does not recognize the shortages. Accordingly, the synthetic reactions may fail.

In order to detect shortages of the reagents or solvents by providing sensors, sensors and other hardware should be additionally provided. Accordingly, the automated chemical synthesizer becomes complicated.

SUMMARY OF THE INVENTION

According to one aspect of the invention, an automated chemical synthesizer includes plural reaction vessels, a plurality of containers, at least one liquid dispenser, a liquid amount storage, a dispensing amount calculator, and a liquid shortage detector. The plurality of containers are configured to contain liquid chemicals respectively. The at least one liquid dispenser is configured to dispense the liquid chemicals from the plurality of containers to the plural reaction vessels according to a synthesizing protocol. The liquid amount storage is configured to memorize a present amount of each of the liquid chemicals in the plurality of containers. The dispensing amount calculator is configured to calculate a dispensing amount of each of the liquid chemicals to be dispensed according to the synthesizing protocol. The liquid shortage detector is configured to detect shortages of the liquid chemicals in the plurality of containers by comparing the present amount memorized in the liquid amount storage and the dispensing amount calculated by the dispensing amount calculator.

According to another aspect of the invention, an automated chemical synthesizer includes plural reaction vessels, a plurality of liquid containers for containing liquid chemicals respectively, liquid dispensing means, liquid amount storage means, dispensing amount calculation means, and liquid shortage detecting means. The liquid dispensing means dispense the liquid chemicals from the plurality of liquid containers to said plural reaction vessels according to a synthesizing protocol. The liquid amount storage means memorize a present amount of each of the liquid chemicals in the plurality of liquid containers. The dispensing amount calculation means calculate a dispensing amount of each of the liquid chemicals to be dispensed according to the synthesizing protocol. The liquid shortage detecting means detect shortages of the liquid chemicals in the plurality of liquid containers by comparing the present amount memorized in the liquid amount storage means and the dispensing amount calculated by the dispensing amount calculation means.

Further, according to another aspect of the invention, a liquid shortage detecting system for an automated chemical synthesizer includes a liquid amount storage, a dispensing amount calculator, and a liquid shortage detector. The liquid amount storage is configured to memorize a present amount of each of liquid chemicals in a plurality of liquid containers. The dispensing amount calculator is configured to calculate a dispensing amount of each of the liquid chemicals to be dispensed according to the synthesizing protocol. The liquid shortage detector is configured to detect shortages of the liquid chemicals in the plurality of liquid containers by comparing the present amount memorized in the liquid amount storage and the dispensing amount calculated by the dispensing amount calculator.

Further, according to the other aspect of the invention, a method for detecting liquid shortages in an automated chemical synthesizer includes memorizing a present amount of each of liquid chemicals in a plurality of liquid containers. A dispensing amount of each of the liquid chemicals to be dispensed are calculated according to the synthesizing protocol. Shortages of the liquid chemicals in the plurality of liquid containers are detected by comparing the present amount memorized in the liquid amount storage and the dispensing amount calculated by the dispensing amount calculator.

BRIEF DESCRIPTION OF THE DRAWINGS

A more complete appreciation of the invention and many of the attendant advantages thereof will become readily apparent with reference to the following detailed description, particularly when considered in conjunction with the accompanying drawings, in which:

FIG. 5 illustrates an example of a liquid amount storage;

FIG. 10 is a block diagram showing an automated chemical synthesizer for synthesizing compounds according to an embodiment of the present invention;

DETAILED DESCRIPTION OF THE PREFERRED EMBODIMENTS

Figure 1:
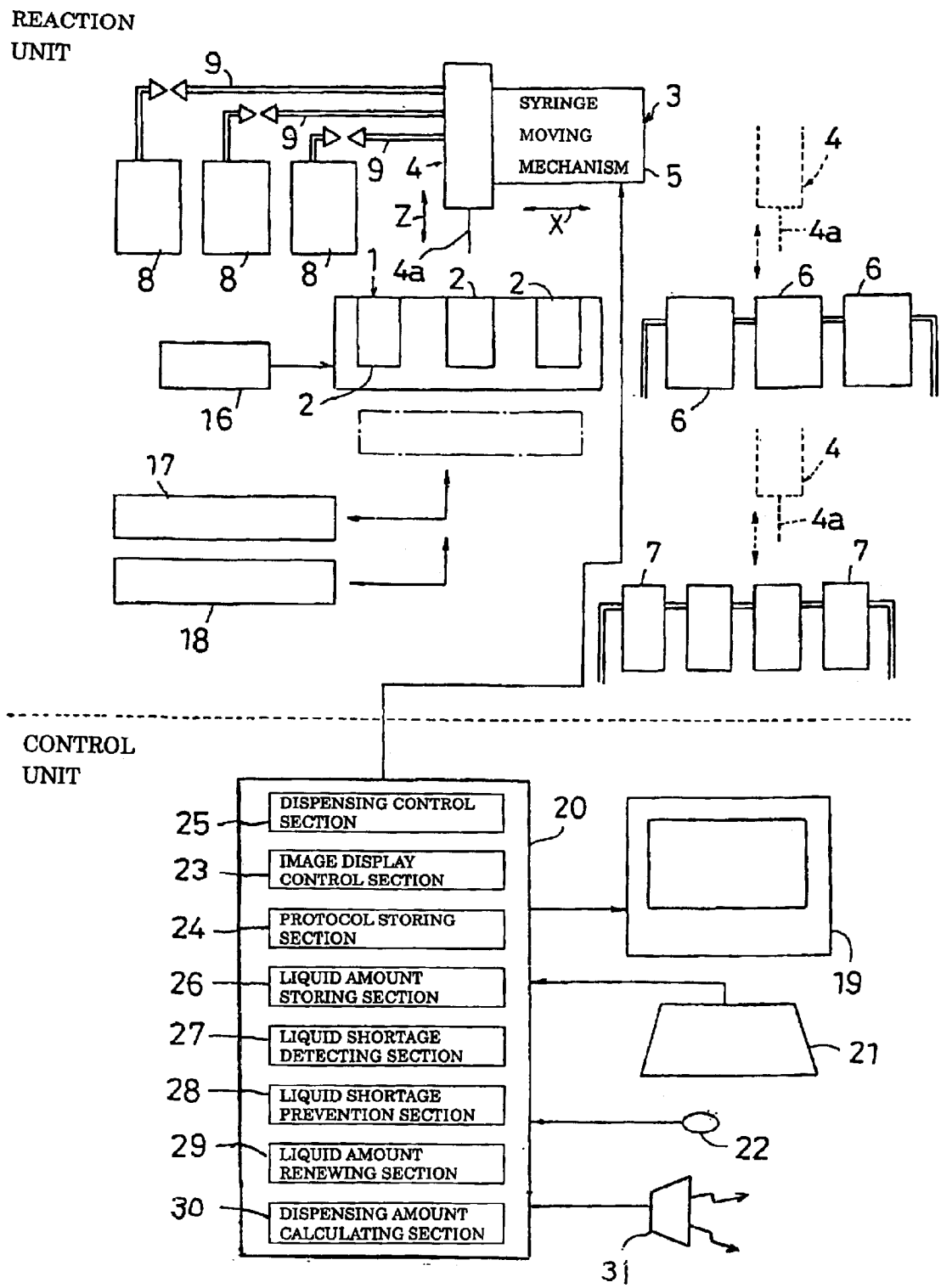
FIG. 1 is a block diagram showing an automated chemical synthesizer for synthesizing organic compounds according to an embodiment of the present invention.

The preferred embodiments will now be described with reference to the accompanying drawings, wherein like reference numerals designate corresponding or identical elements throughout the various drawings.

Figure 2:
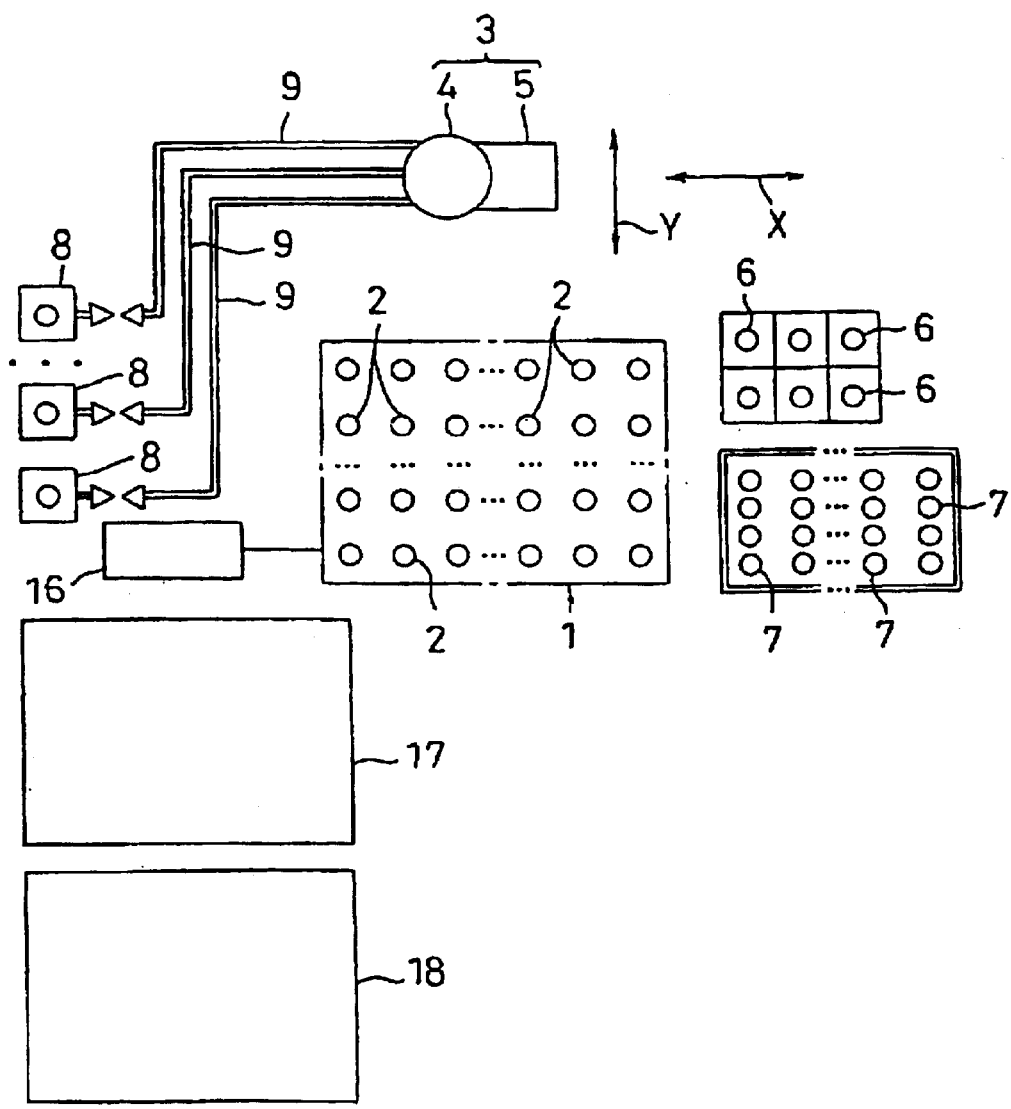
FIG. 2 is a schematic top plan view of a reaction unit of the automated chemical synthesizer shown in FIG. 1.

FIG. 1 shows an automated chemical synthesizer for synthesizing organic compounds according to an embodiment of the present invention. Referring to FIG. 1, the automated chemical synthesizer includes a reaction unit and a control unit. In the reaction unit, synthetic reactions take place. The control unit controls the operations in the reaction unit. The reaction unit of the automated chemical synthesizer includes a reaction block 1 and a liquid dispenser 3. The reaction block 1 includes a number of reaction vessels 2 in which synthetic reactions take place. The liquid dispenser 3 dispenses liquid chemicals, i.e., reagents and solvents to the reaction vessels 2 according to preset dispensing procedure of the synthesizing protocols. As shown in FIG. 2, the reaction vessels 2 are arranged in a column and row matrix in the reaction block 1. The number of reaction vessels 2 provided in the reaction block 1 need not be specific but may be set, for example, around from ten to several hundreds such as 96, 384 or the like.

Referring to FIGS. 1 and 2, the liquid dispenser 3 includes a syringe 4 and a syringe moving mechanism 5 which moves the syringe 4 right and left along an (x) direction, back and forward along a (Y) direction, and up and down along a (Z) direction according to the preset dispensing protocols. The syringe moving mechanism 5 moves the syringe 4 according to commands received from the control unit.

Liquid containers include large reagent vials 6 which contain large use amount reagents, small reagent vials 7 which contain small use amount reagents, and gallon bins 8 which contain solvents. The large reagent vials 6 and small reagent vials 7 are provided next to the reaction block 1. Both large and small reagent vials (6 and 7) are provided as many as needed. Also, gallon bins 8 are provided next to the reaction block 1. The gallon bins 8 are connected to the syringe 4 by tube lines 9, respectively.

Figure 4:
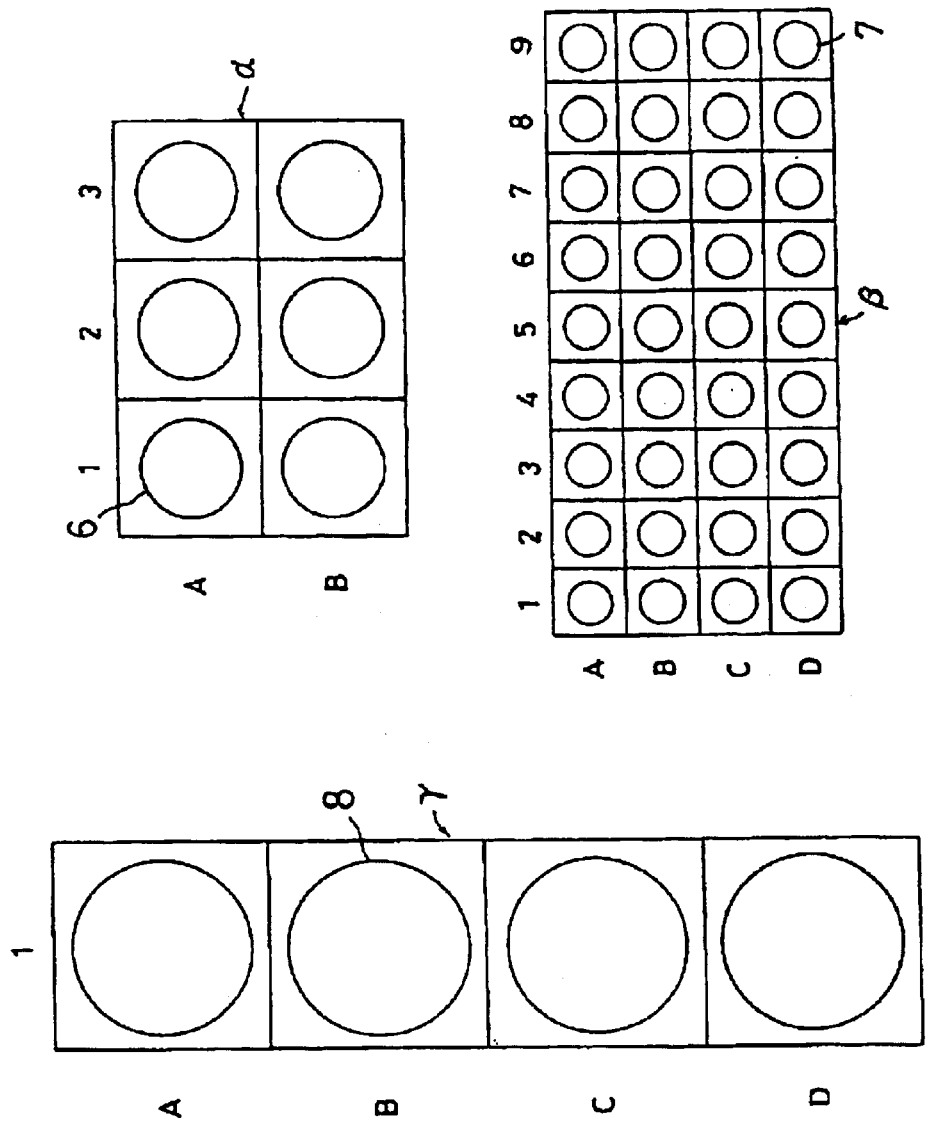
FIG. 4 is an explanatory drawing explaining position addresses.

Referring to FIG. 4, each position address is assigned to each position at which each of the large and small reagent vials (6 and 7) and gallon bins 8 is set. In FIG. 4, six large reagent vials 6, thirty six small reagent vials 7, and four gallon bins 8 may be set α, β and γ are assigned to respective position addresses of the large and small reagent vials (6 and 7) and the gallon bins 8. Columns may be identified by numerals and rows may be identified by alphabets. For example, the position address of an upper left of the large reagent vial 6 is α(A, 1), the position address of a lower right of the small reagent vial 7 is β(D, 9), and the position address of the second from the top of the gallon bin 8 is γ(B, 1).

As shown by dotted lines in FIG. 1, to dispense the reagents to the reaction vessels 2, the syringe 4 moves to the designated location corresponding to the large or small reagent vials (6 or 7) which contain reagents to be dispensed. Next, the syringe 4 draws the reagent from the designated reagent vial through a needle (4a) provided to the syringe 4. Then, the syringe 4 moves to a designated reaction vessel 2 and dispenses the drawn reagent through the needle (4a) to the designated reaction vessel 2.

To dispense the solvents to the reaction vessels 2, a designated solvent is supplied to the syringe 4 through the tube line 9. After the syringe 4 moves to the designated reaction vessel 2, the solvent supplied to the syringe 4 is dispensed to the designated reaction vessel 2 through the needle (4a).

Figure 3:
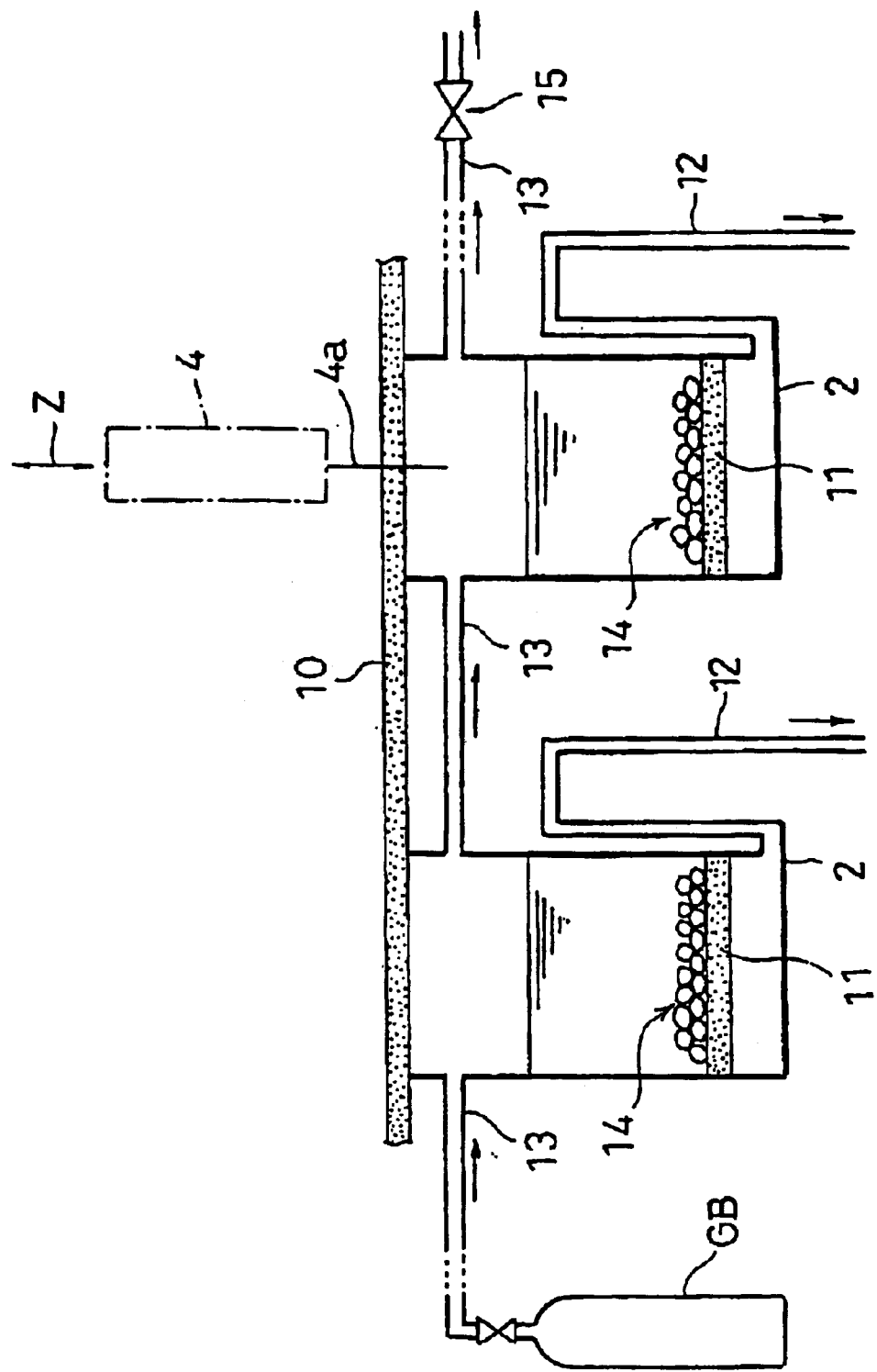
FIG. 3 is a schematic side view of main components in a reaction rack of the automated chemical synthesizer shown in FIG. 1.

Referring to FIG. 3, the reaction block 1 of the embodiment includes a common septum 10, filters 11, drainage tubes 12 and a gas line 13. The common septum 10 is in a sheet form and covers dispensing openings of the reaction vessels 2. The filter 11 is provided in each reaction vessel 2 to close the bottom opening of the reaction vessel 2. A liquid passes through the filter 11 when the liquid is pressurized. Each drainage tube 12 is connected to the bottom of each reaction vessel 2. A gas tank (GB) is connected to the reaction vessels 2 via a gas line 13 in the vicinity of the dispensing openings of the reaction vessels 2. Accordingly, a pressurized gas such as a compressed inert gas can be introduced into the reaction vessels 2 from the gas tank (GB) through the gas line 13. In order to dispense the reagent or the solvent to the reaction vessel 2, the needle (4a) pierces through the common septum 10 to proceed to the inside of the reaction vessel 2. An appropriate amount of resin granules 14 is deposited inside each reaction vessel 2 for solid phase reactions. A valve 15 is provided near the end of the gas line 13. The valve 15 is closed when a pressurized gas is introduced into the reaction vessels 2.

Referring to FIG. 1, the reaction unit includes a vibrator 16, a discharging tray 17 and a collecting block 18. The vibrator 16 vibrates the reaction block 1 during synthesizing process reactions to vibrate the resin granules 14 in each reaction vessel 2. Waste materials produced in each reaction vessel 2 as a result of the chemical reactions are discharged to the discharging tray 17. A chemical compound produced in each reaction vessel 2 as a result of the chemical reactions is collected by the collecting block 18. Both the discharging tray 17 and the collecting block 18 are arranged to move between a waiting position and a position underneath the reaction block 1.

The synthesizing process includes single or a plurality of reaction cycles. Each reaction cycle includes a dispensing process, a reaction process, and a discharging process. In the dispensing process, the liquid dispenser 3 dispenses the reagents and solvents to the reaction vessels 2. In the reaction process, solid phase reactions take place inside the resin granules 14. In the discharging process, the pressurized gas in the gas tank (GB) is introduced into each reaction vessel 2 through the gas line 13, so that the reagents and the solvents in the reaction vessel 2 pass through the filter 11 and flow into the discharging tray 17 via the drainage tube 12.

After the final reaction is complete, in a collecting process, in order to collect the compounds synthesized in the resin granules 14, an extraction liquid, usually an acid solvent, is supplied to each reaction vessel 2 through the dispensing opening in order to extract the desired compounds from the resin granules 14. Following the extraction of the desired compounds, the pressurized gas in the gas tank (GB) is introduced into each reaction vessel 2 through the gas line 13, so that the desired compounds together with the extraction 18 liquid pass through the filter 11 and flow into the collecting block 18 via the drainage tube 12.

Referring to FIGS. 1, 4, 5, 6, 7 and 8, the control unit in the embodiment will be explained. Referring to FIG. 1, the control unit of the automated chemical synthesizer of the embodiment includes a monitor 19, a controller 20, a keyboard 21, and a mouse (or a pointing device) 22. The monitor 19 displays protocol setting pictures necessary for the operation of the automated chemical synthesizer. The controller 20 controls the operation of the automated chemical synthesizer.

The controller 20 includes an image display control section 23, a protocol storing section 24, a dispensing control section 25, a liquid amount storing section (a liquid amount memory) 26, a liquid shortage detecting section 27, a liquid shortage prevention section 28, a liquid amount renewing section 29, and a dispensing amount calculating section 30.

The image display control section 23 controls the monitor 19 to display the protocol setting pictures. The protocol storing section 24 stores synthesizing protocol according to which the synthesizing process is carried out and which is set by an operator by using the keyboard 21 and the mouse 22. The dispensing control section 25 sends command signals to the liquid dispenser 3 so as to dispense the reagents and the solvents according to dispensing procedure of the synthesizing protocol stored in the protocol storing section 24. The liquid amount storing section 26 stores the present amounts of liquid chemicals, i.e., reagents and solvents, which are contained in the liquid containers, i.e., large and small reagent vials (6 and 7) and gallon bins 8.

The initial liquid amounts of reagents in the large and small reagent vials (6 and 7) and the initial liquid amounts of solvents in the gallon bins 8 when the large and small reagent vials (6 and 7) and the gallon bins 8 are set at the respective positions in the chemical synthesizer are stored in the liquid amount storing section 26 corresponding to the respective position addresses. After the operator sets the large and small reagent vials (6 and 7) and the gallon bins 8 at the respective positions in the chemical synthesizer, the operator sets the initial liquid amounts. In order to set the initial liquid amount, an operator uses the keyboard 21 and the mouse 22 according to the setting pictures which are displayed in the monitor 19. For example, when the large reagent vial 6 which contains reagent of 500 cc is set at the position address of α(A, 1), the initial amount of 500 cc is set in the liquid amount storing section 26 corresponding to the position address of α(A, 1).

Referring to FIG. 5, the liquid amount storing section 26 includes an area in which present amount of reagents and solvents are stored corresponding to the respective position addresses. When the operator sets the initial liquid amounts as described above, the initial liquid amounts of reagents and the initial liquid amounts of solvents are stored in the liquid amount storing section 26 corresponding to respective position addresses.

In order to set the synthesizing protocol, an operator uses the keyboard 21 and the mouse 22 according to setting pictures which are displayed in the monitor 19. The protocol storing section 24 stores the synthesizing protocol. The synthesizing protocol includes, for example, a plurality of processes for synthesizing compound, an order of the plurality of processes, specific procedures in each process and the like.

The dispensing procedure of the synthesizing protocol includes information with respect to an amount of liquid chemicals to be dispensed, liquid containers (6, 7 and 8) which contain the liquid chemicals to be dispensed, and reaction vessels 2 to which the liquid chemicals are dispensed. For example, in a certain dispensing process, the small use amount reagent of 1 cc is dispensed from the small reagent vial 7 which is set at a position address of β(B, 5) to each of all reaction vessels 2, and the solvent of 2 cc is dispensed from the solvent vessel 8 which is set at a position address of γ(C, 1) to each of all reaction vessels 2. Further, individual position addresses are also assigned to respective reaction vessels 2. Accordingly, in another dispensing procedure, reagent or solvent may be dispensed to specific reaction vessels 2 or a part of all reaction vessels 2.

The liquid shortage detecting section 27 detects shortages of liquid chemicals, i.e., reagents in the large and small reagent vials (6 and 7) and solvents in the gallon bins 8 by comparing the dispensing amounts of reagents and solvents to be dispensed according to the synthesizing protocol and the present amounts of the reagents and the solvents stored in the liquid amount storing section 26. The liquid shortage detecting section 27 detects the shortages of reagents and solvents before and/or while synthesizing process is carried out according to the synthesizing protocol.

The control unit of the embodiment described above comprises a personal computer in which software is installed. Data storages such as the protocol storing section 24, the liquid amount storing section 26 and the like are provided in volatile memories in the personal computer or external storages. Processing and controlling portions, such as the image display control section 23, the dispensing control section 25, the liquid shortage detecting section 27, the liquid shortage prevention section 28, a liquid amount renewing section 29, and the dispensing amount calculating section 30 is provided in a CPU in the personal computer.

Next, the operation of the synthesizer will be explained. In order to carry out the synthesizing process, an operator sets a synthesizing protocol for carrying out the synthesizing process in the synthesizer. Further, the operator inputs the initial liquid amounts of reagents in the large and small reagent vials (6 and 7) and solvents in the gallon bins 8 when he positions the large and small reagent vials (6 and 7) and the gallon bins 8.

The liquid shortage detecting section 27 detects the shortages of reagents and solvents in advance before the synthesizing process starts.

The liquid shortage detecting section 27 detects whether shortage of liquid chemical, i.e., reagent in the large or small reagent vial (6 and 7) and solvent in the gallon bin 8 will occur during the synthesizing process by comparing the calculated dispensing amount of reagent or solvent with the present amount of the reagent in the large or small reagent vial (6 or 7) or solvent in the gallon bin 8.

Concretely, an example in which the liquid shortage detecting section 27 detects the shortage of reagent in the small reagent vial 7 whose position address is β(A, 1) will be explained.

The liquid amount storing section 26 memorizes 50 cc as the present liquid amount of the reagent in the small reagent vial 7 whose position address is β(A, 1). In the synthesizing process, the dispenser 3 will dispense the reagent of 1 cc from the small reagent vial 7 to each of twenty five reaction vessels in the first dispensing process of the first reaction cycle, and will dispense the reagent of 1 cc from the small reagent vial 7 to each of thirty reaction vessels in the second dispensing process of the second reaction cycle.

In this case, the dispensing amount of the reagent during the first dispensing process will be 25 cc (1 cc×25). The liquid amount storing section 26 stores 50 cc as the present liquid amount of the reagent in the small reagent vial 7. Accordingly, in the first dispensing process, it is determined that a shortage of the reagent will not occur.

In the second dispensing process, the dispensing amount of the reagent will be 30 cc (1 cc×30). Accordingly, the accumulated dispensing amount of the reagent is 55 cc (25 cc+30 cc), which is larger than the present liquid amount of the reagent of 50 cc. Therefore, it is detected that the reagent in the small reagent vial 7 will be short in the second dispensing process. Further, when the accumulated dispensing amount of all dispensing processes is calculated, the final shortage amount can be calculated.

Figure 6:
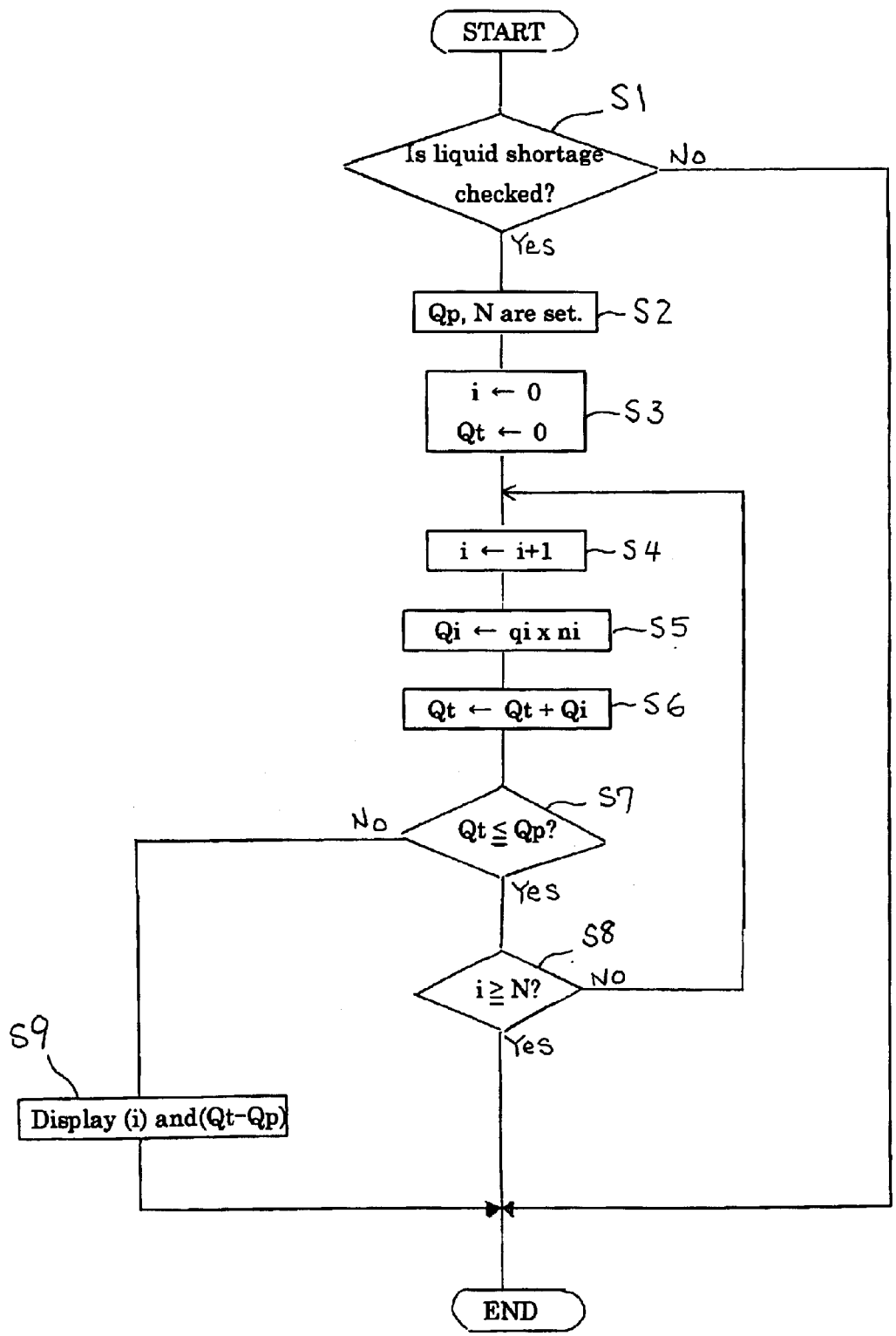
FIG. 6 is a flow chart for checking the liquid shortage in one liquid container.

FIG. 6 is a flow chart for checking the liquid shortage in one liquid container before the synthesizing process starts. Liquid shortages in other liquid containers are also checked according to the similar flow charts. Referring to FIG. 6, at step (S1), it is determined whether liquid shortage is to be checked. When it is determined that the liquid shortage is not to be checked, the synthesizing process is carried out according to another flowchart for carrying out the synthesizing process (not shown). When it is determined that the liquid shortage is to be checked, the present liquid amount (Qp) and the number (N) of dispensing processes are set at step (S2). At step (S3), a counter (i) and the accumulated dispensing amount (Qt) are set to zero. At step (S4), the counter (i) increases by 1. At step (S5), the dispensing amount (Qi) during the (i)th dispensing process is calculated. During the (i)th dispensing process, the liquid dispenser 3 will dispense the liquid chemical of (qi) cc to (ni) reaction vessels. Accordingly, the dispensing amount (Qi) is calculated based on the following equation.

$$Qi=qi*ni$$

At step (S6), the accumulated dispensing amount (Qt) is calculated by accumulating the dispensing amount (Qi). At step (S7), it is determined whether the accumulated dispensing amount (Qt) is smaller than or equal to the present liquid amount (Qp). If it is determined that the accumulated dispensing amount (Qt) is smaller than or equal to the present liquid amount (Qp), i.e., the shortage of the liquid will not occur in this dispensing process, it is determined whether the counter (i) is larger than or equal to the number (N) of dispensing processes at step (S8). When it is determined that the counter (i) is smaller than the number (N) of dispensing processes, the routine goes back to step (S4), and the liquid shortage in the next dispensing process will be checked.

At step (S7), if it is determined that the accumulated dispensing amount (Qt) is larger than the present liquid amount (Qp), i.e., the shortage of the liquid will occur in this dispensing process, the display controller 23 controls the monitor 19 to display that the liquid in this container will be short in the (i)th dispensing process and that the shortage amount is (Qt-Qp) at step (S9). In this case, the synthesizing process will not be carried out.

Figure 7:
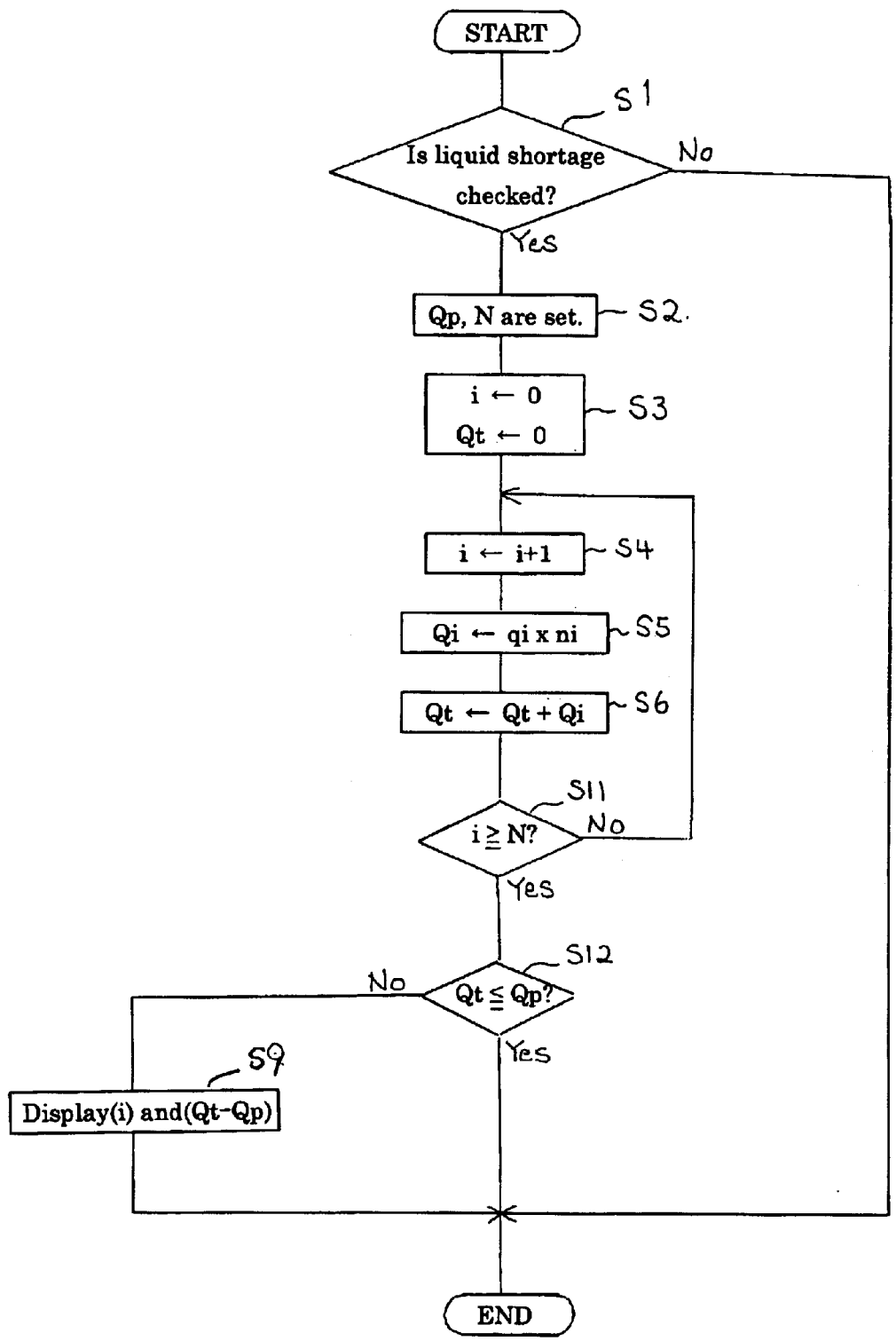
FIG. 7 is a flow chart for checking the liquid shortage in one liquid container.

In FIG. 6, the liquid shortage is checked every time the accumulated dispensing amount (Qt) is calculated in order to identify in which dispensing process the liquid shortage will occur. However, as shown in FIG. 7, the accumulated dispensing amount in all dispensing processes may be compared with the present liquid amount. Referring to FIG. 7, at steps (S4), (S5), (S6) and (S11), the accumulated dispensing amount (Qt) in all dispensing processes is calculated. Then, at step (S12), it is determined whether the accumulated dispensing amount (Qt) is smaller than or equal to the present liquid amount (Qp). Namely, it is determined whether the shortage of the liquid occurs in this synthesizing process.

Figure 8:
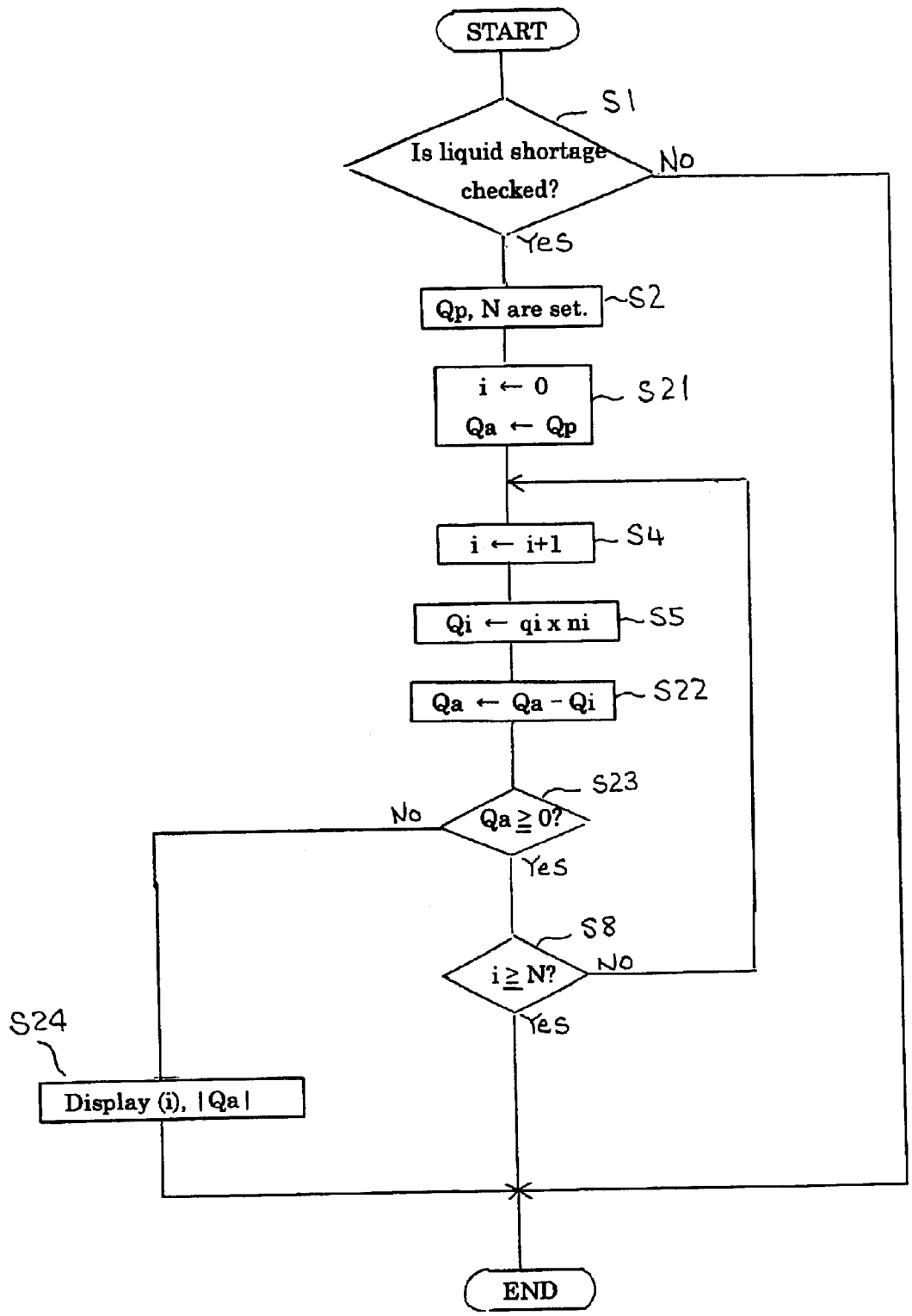
FIG. 8 is a flow chart for checking the liquid shortage in one liquid container.

Further, as shown in FIG. 8, the dispensing amount (Qi) in each dispensing process may be subtracted from the present liquid amount (Qp) and it may be determined that the shortage will occur when the present liquid amount (Qp) is less than zero. Referring to FIG. 8, at step (S21), a counter (i) is set to zero and an assumed liquid amount (Qa) is set to the present liquid amount (Qp). At step (S22), a renewed assumed liquid amount (Qa) is calculated by subtracting the dispensing amount (Qi) during (i)th dispensing process from the assumed liquid amount (Qa). At step (S23), it is determined whether the assumed liquid amount (Qa) is larger than or equal to zero. If it is determined that the assumed liquid amount (Qa) is larger than or equal to zero, i.e., the shortage of the liquid will not occur in this dispensing process, the routine goes back to step (S4) and it is further determined whether the shortage of the liquid occurs. When it is determined that the assumed liquid amount (Qa) is smaller than zero, i.e., the shortage of the liquid will occur in this dispensing process, the display controller 23 controls the display 19 to display that the liquid in this container will be short in the (i)th dispensing process and that the shortage amount is |(Qa)| at step (S24). In this case, the synthesizing process will not be carried out.

Further, when a plurality of large reagent vials 6 contain the same reagents, and when the dispensing procedure is set to dispense the same reagents from any one of the plurality of large reagent vials 6, the shortage of the reagent may be detected according to the usage of the plurality of large reagent vials 6. With respect to the small reagent vials 7 and the gallon bins 8, a similar process may apply to detect the shortages.

As described above, the liquid shortage detecting section 27 detects the shortages of reagents or solvents before the synthesizing process is carried out.

When the liquid shortage detecting section 27 detects the shortages of reagents or solvents, the liquid shortage prevention section 28 controls the image display control section 23 to display detailed information in the monitor 19. For example, the monitor 19 displays how much liquid will be short, the shortage will occur in which container in which dispensing process and the like. According to this information, the operator may modify the synthesizing protocol or exchange the liquid containers, i.e., the large reagent vials 6, small reagent vials 7 or the gallon bins 8 to avoid the shortage during the synthesizing process.

The liquid shortage prevention section 28 may turn on a buzzer 31 to notify the operator of the shortages of reagents or solvents. Further, the controller 20 may be constructed not to carry out the synthesizing process even though the operator commands to carry out the synthesizing process when the liquid shortage detecting section 27 detects the shortage of reagents or solvents.

As described above, the shortages of the reagents and the solvents during the synthesizing process may be avoided. Accordingly, the failure in synthesis because of the shortage of the reagents or the solvents may be prevented, and so the waste of the reagents and the solvents may also be prevented. Since the shortage detection of the reagents and the solvents is performed based on software, no additional hardware such as a sensor is necessary.

Since the liquid shortage detecting section 27 detects whether the shortages of the reagents and the solvents during the synthesizing process will occur before the synthesizing process starts, the shortages of the reagents and the solvents may be avoided before the synthesizing process starts.

The liquid shortage detection may automatically start, or an operator may command to detect the shortages of liquids.

Next, the detection of shortages of reagents and solvents while synthetic process is carried out according to the synthesizing protocol will be explained.

The synthesizing process starts when the operator commands by using the keyboard 21 or the mouse 22 to carry out the synthesizing process. When the operator commands to carry out the synthesizing process, the synthesizing process starts from the first process according to the synthesizing protocol stored in the protocol storing section 24.

Before the liquid dispenser 3 dispenses reagents and solvents during the dispensing process according to the synthesizing protocol, the liquid shortage detecting section 27 detects whether the shortages of liquid chemicals, i.e., reagents in the large and small reagent vials (6 and 7) and solvents in the gallon bins 8 will occur by comparing the calculated dispensing amount in the dispensing process and the present amount of the reagents or solvents which is memorized in the liquid amount storing section 26.

For example, during the dispensing process, the dispenser 3 will dispense the reagent of 1 cc from the small reagent vial 7 whose position address is β(B, 5) to each of thirty reaction vessels 2, and further dispense the solvent of 2 cc from the gallon bin 8 whose position address is γ(C, 1) to each of twenty reaction vessels.

It is supposed that the liquid amount storing section 26 stores 40 cc as the present amount of the reagent in the small reagent vial 7 and 100 cc as the present amount of the solvent in the gallon bin 8. In this case, the dispensing amount of the reagent during this dispensing process will be 30 cc (1 cc×30) and the dispensing amount of the solvent during this dispensing process will be 40 cc (2 cc×20). Accordingly, a shortage will not occur in this dispensing process. When it is determined that a shortage will not occur, the synthesizing process continues.

However, if the liquid amount storing section 26 stores 20 cc as the present amount of the reagent in the small reagent vial 7 and 100 cc as the present amount of the solvent in the gallon bin 8, the reagent in the small reagent vial 7 will be short in this dispensing process. In this case, for example, the synthesizing process stops before the dispensing process is carried out. Additionally, the liquid shortage prevention section 28 controls the image display control section 23 to display information in the monitor 19. For example, the monitor 19 displays how much liquid will be short, the shortage will occur in which container in which dispensing process and the like. The liquid shortage prevention section 28 may turns on the buzzer 31 to notify the operator of the shortage of reagents or solvents.

According to the information with respect to the shortage, the operator, for example, exchanges the large reagent vials 6, small reagent vials 7 or the gallon bins 8 to avoid the shortage during the synthesizing process, and reset the present amounts of liquids. Then, when the operator commands resumption, the synthesizing process restarts from the process which was stopped.

As described above, when it is determined that the shortage of the agents or the solvents will occur during the dispensing process, the synthesizing process stops without carrying out the dispensing process. Accordingly, the failure in synthesis because of the shortage of the reagents or the solvents may be prevented. Further, the operator may learn the shortage of the reagents and the solvents before such a shortage actually occurs.

The liquid amount renewing section 29 renews the present liquid amounts which are stored in the liquid amount storing section 26. Namely, the liquid amount which is calculated by subtracting the dispensing amount from the present liquid amount is stored as a renewed present liquid amount in the liquid amount storing section 26.

For example, if the liquid amount storing section 26 stores 40 cc as the present amount of the reagent in the small reagent vial 7 and 100 cc as the present amount of the solvent in the gallon bin 8 before the dispensing process is carried out, the liquid amount renewing section 29 resets the present amount of the reagent in the small reagent vial 7 from 40 cc to 10 cc (the present liquid amount 40 cc—the dispensing liquid amount 30 cc), and the present amount of the solvent in the gallon bin 8 from 100 cc to 60 cc (the present solvent amount 100 cc—the dispensing liquid amount 40 cc).

The liquid amount renewing section 29 renews the present liquid amounts which are stored in the liquid amount storing section 26 after the liquid shortage detecting section 27 detects whether the shortage will occur.

Figure 9A:
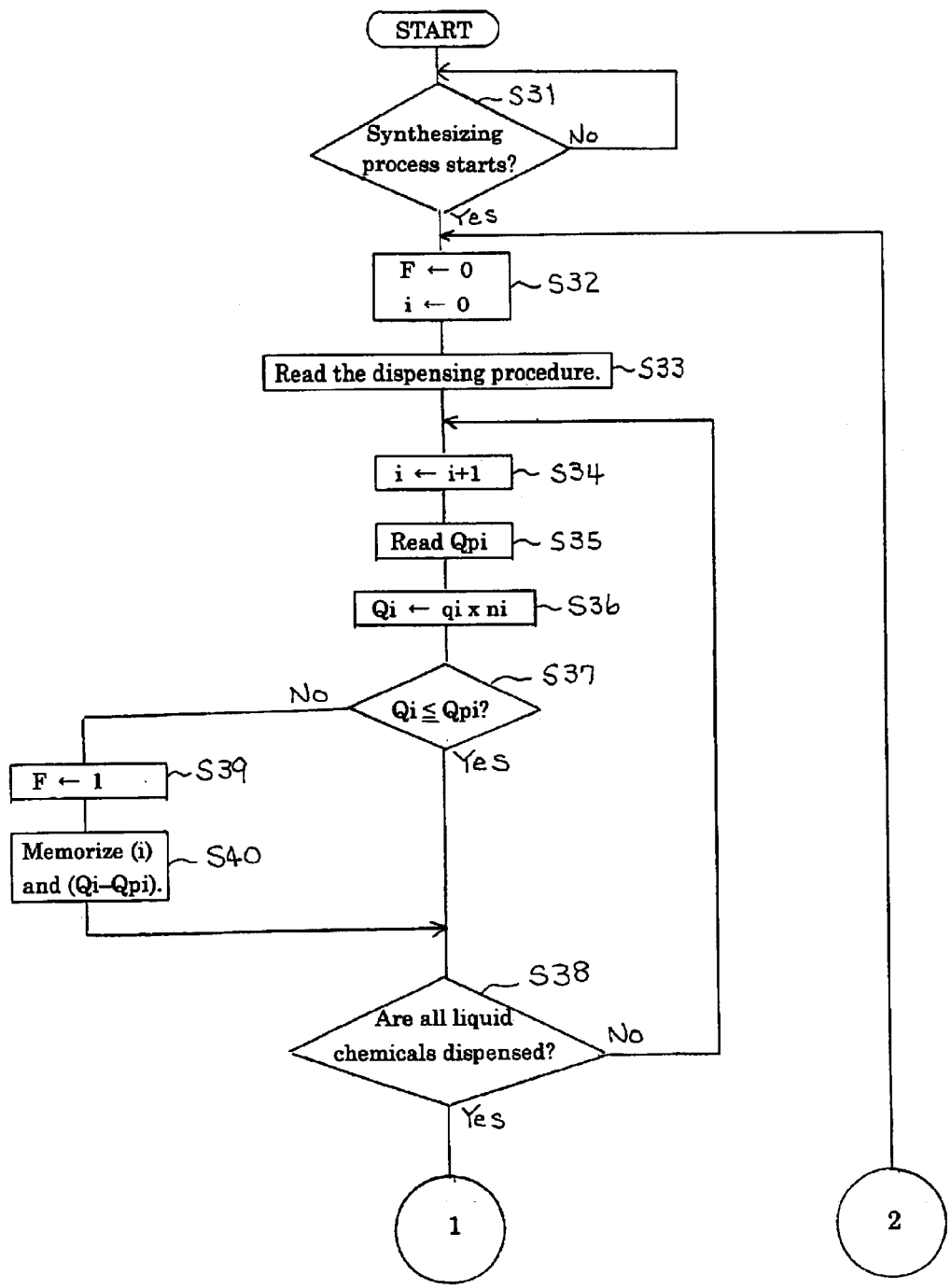
FIGS. 9A and 9B are flow charts for checking the liquid shortages in liquid containers.
Figure 9B:
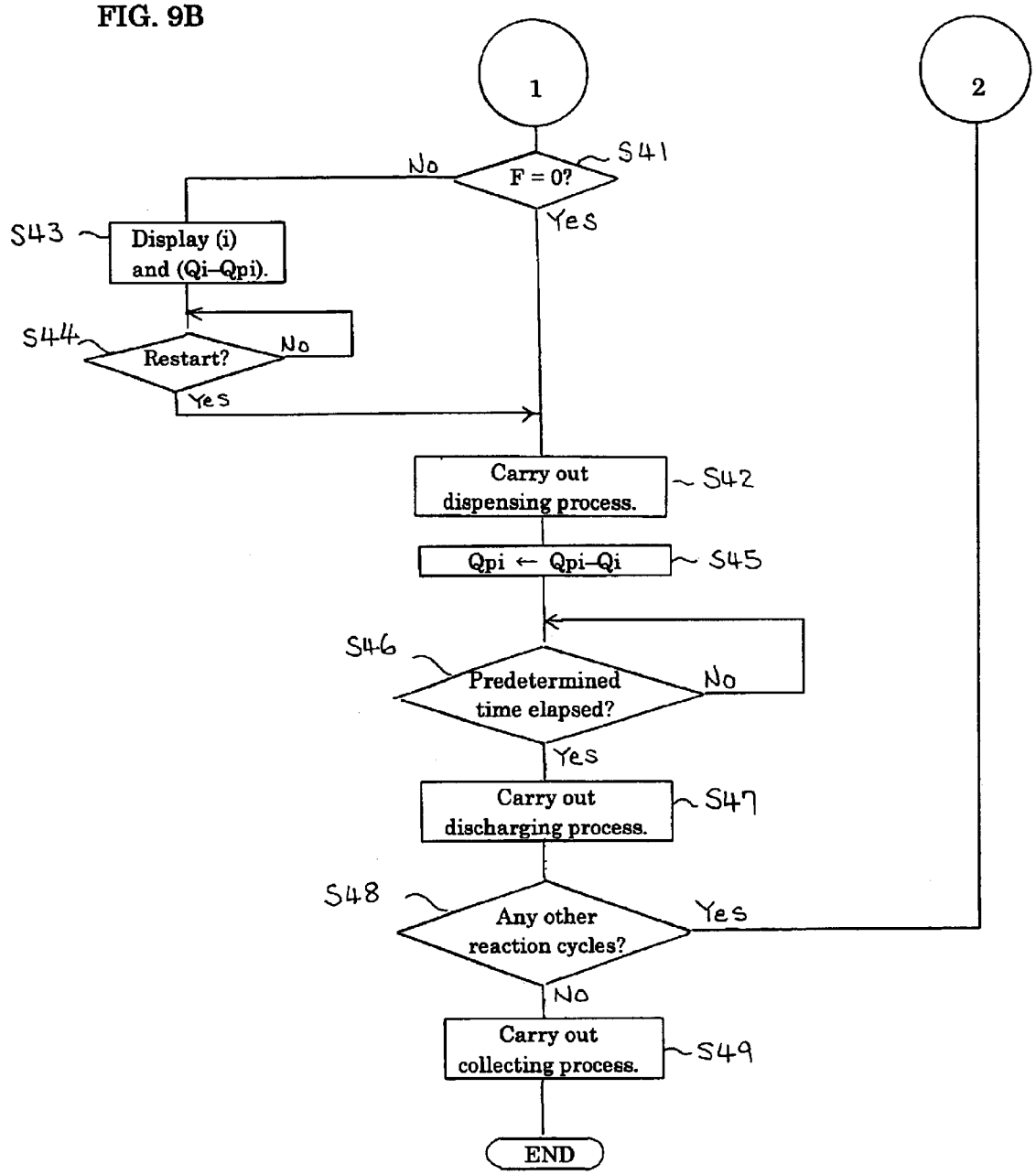

FIGS. 9A and 9B illustrate a flow chart for checking the liquid shortage while the synthesizing process is carried out. Referring to FIGS. 9A and 9B, at step (S31), it is determined whether an operator commands to start the synthesizing process. When it is determined that the operator does not command to start the synthesizing process, the routine does not go to the next step. On the other hand, when it is determined that the operator commands to start the synthesizing process, a flag (F) and a counter (i) are set to zero at step (S32). At step (S33), the dispensing procedure is read from the protocol storing section 24. The dispensing procedure includes the kinds of liquid chemicals to be dispensed, dispensing amounts of liquid chemicals, the number of reaction vessels 2 to which the liquid chemicals are to be dispensed and the like. At step (S34), the counter (i) increases by 1. At step (S35), the present liquid amount (Qp1) of first liquid chemical which will be dispensed first (the counter (i) is equal to 1) is read from the liquid amount storage section 26. At step (S36), the dispensing amount (Qi) of the first liquid chemical is calculated. During the present dispensing process, the liquid dispenser 3 will dispense the first liquid chemical of (q1) cc to (n1) reaction vessels. Accordingly, the first dispensing amount (Q1) is calculated based on the following equation.

$$Q1=q1*n1$$

At step (S37), it is determined whether the dispensing amount (Qi) is smaller than or equal to the present liquid amount (Qpi). If it is determined that the dispensing amount (Qi) is smaller than or equal to the present liquid amount S (Qpi), i.e., the shortage of the liquid will not occur, it is determined whether liquid shortages have been checked with respect to all liquid chemicals to be dispensed in this dispensing process at step (S38). When it is determined that the liquid shortage has not been checked with respect to all liquid chemicals to be dispensed in this dispensing process, the routine goes back to step (S34) and the liquid shortage of liquid chemical which will be dispensed secondly will be checked.

At step (S37), when it is determined that the dispensing amount (Qi) is larger than the present liquid amount (Qpi), i.e., the shortage of the liquid will occur, the flag (F) is set to 1 at step (S39). Then, at step (S40), the kind of liquid chemical which will be short and the amount of the shortage (Qi-Qpi) are memorized, and then the routine goes to step (S38).

At step (S38), when it is determined that the liquid shortages have been checked with respect to all liquid chemicals to be dispensed in this dispensing process, it is determined whether the flag (F) is equal to zero at step (S41). When it is determined that the flag (F) is equal to zero, i.e., the shortage of the liquid chemical will not occur, the dispensing process is carried out at step (S42). On the other hand, when it is determined that the flag (F) is not equal to zero, i.e., the shortage of the liquid chemical will occur, the image display control section 23 controls to display the kind of liquid chemical which will be short and the amount of the shortage (Qi-Qpi) in the monitor 19 at step (S43). Then at step (S44), it is determined whether the operator commands to restart the synthesizing process after replacing the liquid container in which the shortage will occur or changing the synthesizing protocol to avoid the shortage of the liquid chemical. The synthesizing process is stopped until it is determined that the operator commands to restart the synthesizing process. When it is determined that the operator commands to restart the synthesizing process, the routine goes to step (S42). At step (S45), the present liquid amount (Qpi) is renewed by subtracting the calculated dispensing amount (Qi). At step (S46), it is determined whether a predetermined time has elapsed after the dispensing process is complete. Namely, the reaction process continues for the predetermined time. When it is determined that the predetermined time has elapsed, the discharging process is carried out at step (S47). Namely, the pressurized gas in the gas tank (GB) is introduced into each reaction vessel 2 through the gas line 13, so that the reagents and the solvents in the reaction vessel 2 pass through the filter 11 and flow into the discharging tray 17 via the drainage tube 12. At step (S48), it is determined whether there are any other reaction cycles to be carried out. When it is determined that there are any other reactions to be carried out, the routine returns to step (S32) and another reaction cycle will be carried out. At step (S48), when it is determined that there are no other reaction cycles to be carried out, the collecting process is carried out. Namely, after the final reaction is complete, in order to collect the compounds synthesized in the resin granules 14, an extraction liquid, usually an acid solvent, is supplied to each reaction vessel 2 through the dispensing opening in order to extract the desired compounds from the resin granules 14. Following the extraction of the desired compounds, the pressurized gas in the gas tank (GB) is introduced into each reaction vessel 2 through the gas line 13, so that the desired compounds together with the extraction liquid pass through the filter 11 and flow into the collecting block 18 via the drainage tube 12.

As described above, the liquid shortage detecting section 27 detects the shortages of the reagents and the solvents while the synthesizing process is carried out. Accordingly, the shortages of the reagents or the solvents are monitored while the synthesizing process is carried out.

In accordance with the progress of the synthesizing process, the dispensing process of the synthesizing protocol is sometimes changed, for example, the dispensations of the reagents and the solvents are added, changed or canceled. In such a case, new dispensing processes are added, dispensing processes are changed or canceled while the synthesizing process temporarily stops. Before the synthesizing process restarts, the liquid shortage detecting section 27 detects whether shortages of reagents or solvents will occur by comparing the accumulated dispensing amount of reagents or solvents to be dispensed according to the revised synthesizing protocol and the present amount of the reagents or solvents which is memorized in the liquid amount storing section 26. This procedure may be carried out according to, for example, the flow charts shown in FIGS. 6, 7, 8, 9A and 9B according to the revised synthesizing protocol.

Accordingly, even though the dispensing protocol is changed or canceled while the synthesizing process temporarily stops, the liquid shortage detecting section 27 may detect, before the revised synthesizing process restarts, the shortages of the reagents and the solvents which will be dispensed according to the revised dispensing protocol may be detected. Accordingly, the shortages of the reagents or the solvents may be prevented. Therefore, the failure in synthesis because of the shortages of the reagents or the solvents may be prevented.

Further, when the liquid shortage detecting section 27 detects the shortages of the reagents and the solvents, the liquid shortage prevention section 28 controls the image display control section 23 to display detailed information including the information that the shortage will occur in the revised synthesizing process. According to this information, the operator may modify the synthesizing protocol or exchange the liquid containers, i.e., the large reagent vials 6, small reagent vials 7 or the gallon bins 8 to avoid the shortage during the synthesizing process.

Further, when the liquid shortage detecting section 27 detects the shortages of the reagents and the solvents, the synthesizing process may not restart even though the operator commands to restart.

The liquid shortage detection may be automatically performed or an operator may command to perform the liquid shortage detection.

Although liquid shortage detection may be performed with respect to all of the liquid chemicals, the liquid shortage detection may be performed with respect to a part of the liquid chemicals. For example, the liquid shortage detecting section 27 does not perform the liquid shortage detection with respect to certain liquid chemicals when the container contains a lot of such liquid chemicals.

When the controller 20 recognizes the positions of the liquid containers corresponding to the kinds of the liquid chemicals and the liquid dispenser dispenses liquid chemical according to a command that specifies the liquid chemical, the liquid amount storing section may memorize the present amounts of liquid chemicals corresponding to the kinds of the liquid chemicals, and the liquid shortage detecting section 27 may detect the shortages of the liquid chemicals corresponding to the kinds of the liquid chemicals.

The liquid shortage detecting section 27 may detect the shortages of the liquid chemicals before and/or while the synthesizing process is carried out.

FIG. 10 shows an automated chemical synthesizer according to an embodiment of the present invention. In the embodiments described above, although the reaction unit of the automated chemical synthesizer includes only one liquid dispenser 3 which dispenses both of the reagents and the solvents to the reaction vessels 2, the reaction unit may have plural liquid dispensers which dispense the reagents and solvents respectively. For example, in the embodiment as shown in FIG. 10, the reaction unit includes a first liquid dispenser (3a) which dispenses the reagents to the plural reaction vessels 2, and a second liquid dispenser (3b) which dispenses the solvents to the plural reaction vessels 2.

Figure 11:
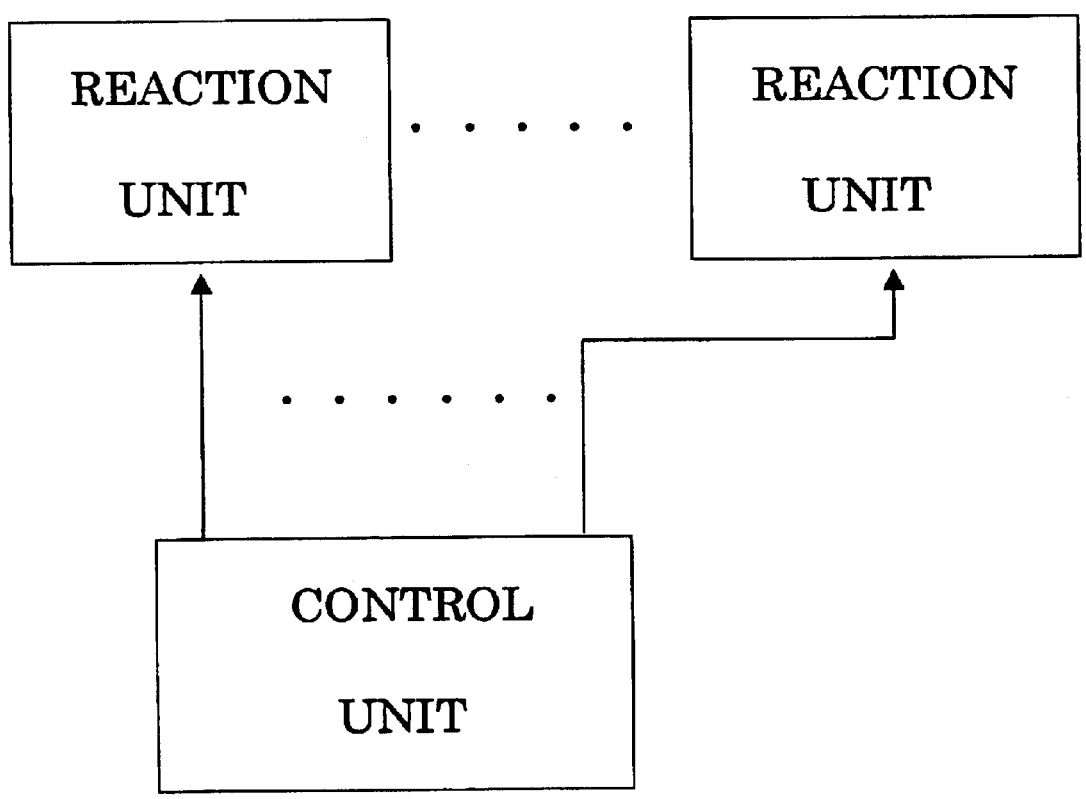
FIG. 11 is a block diagram showing an automated chemical synthesizer for synthesizing compounds according to an embodiment of the present invention.
Figure 12:
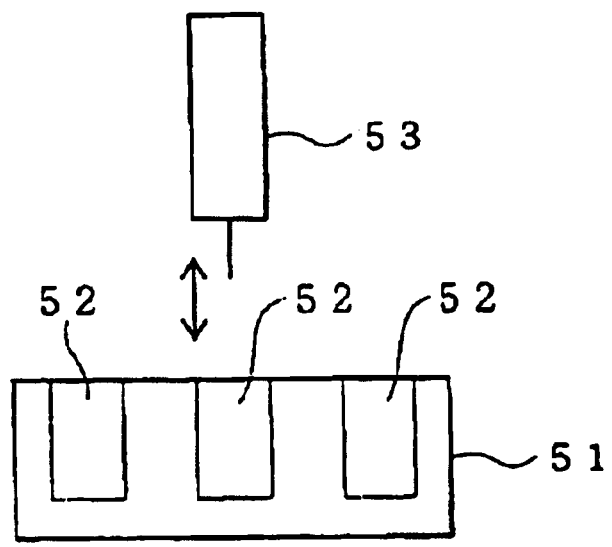
FIG. 12 shows a liquid dispenser and a reaction rack of a conventional automated chemical synthesizer.

FIG. 11 shows an automated chemical synthesizer according to an embodiment of the present invention. In the embodiment, the control unit controls only one reaction unit. However, in the embodiment of the present invention as shown in FIG. 11, the control unit may controls two or more reaction units obviously, numerous modifications and variations of the present invention are possible in light of the above teachings. It is therefore to be understood that, within the scope of the appended claims, the invention may be practiced otherwise than as specifically described herein.

What is claimed as new and is desired to be secured by Letters Patent of the United States is:

1. An automated chemical synthesizer comprising:
    plural reaction vessels;
    a plurality of liquid containers configured to contain liquid chemicals respectively;
    at least one liquid dispenser configured to dispense the liquid chemicals from the plurality of liquid containers to said plural reaction vessels according to a synthesizing protocol;
    a liquid amount memory configured to memorize a present amount of each of the liquid chemicals in the plurality of liquid containers;
    a dispensing amount calculator configured to calculate a dispensing amount of each of the liquid chemicals to be dispensed according to the synthesizing protocol; and
    a liquid shortage detector configured to detect shortages of the liquid chemicals in the plurality of liquid containers by comparing the present amount memorized in the liquid amount memory and the dispensing amount calculated by the dispensing amount calculator.

2. An automated chemical synthesizer according to claim 1, wherein the liquid amount memory is configured to memorize an original amount of each of the liquid chemicals in the plurality of liquid containers when the plurality of liquid containers are set in the automated chemical synthesizer.

3. An automated chemical synthesizer according to claim 1, wherein the plurality of liquid containers are positioned so as to correspond to position addresses respectively, and wherein the liquid amount memory is configured to memorize the present amount of each of the liquid chemicals in the plurality of liquid containers corresponding to each of the position addresses.

4. An automated chemical synthesizer according to claim 1, wherein the dispensing amount calculator is configured to calculate the dispensing amount and the liquid shortage detector is configured to detect the shortages of the liquid chemicals before the synthesizing protocol is carried out.

5. An automated chemical synthesizer according to claim 1, wherein the dispensing amount calculator is configured to calculate the dispensing amount and the liquid shortage detector is configured to detect the shortages of the liquid chemicals after the synthesizing protocol starts to be carried out but before the at least one dispenser dispenses the liquid chemicals whose shortages are to be detected.

6. An automated chemical synthesizer according to claim 1, wherein the synthesizing protocol comprises a plurality of dispensing processes, the dispensing amount calculator is configured to calculate an accumulated dispensing amount by accumulating the dispensing amount of each of the liquid chemicals to be dispensed in each of the plurality of dispensing processes, and wherein the liquid shortage detector is configured to detect, every time the dispensing amount is accumulated, the shortages of the liquid chemicals by comparing the present amount memorized in the liquid amount memory and the accumulated dispensing amount calculated by the dispensing amount calculator.

7. An automated chemical synthesizer according to claim 1, wherein the synthesizing protocol comprises a plurality of dispensing processes, the dispensing amount calculator is configured to calculate an accumulated dispensing amount by accumulating the dispensing amount of each of the liquid chemicals to be dispensed in each of the plurality of dispensing processes, and wherein the liquid shortage detector is configured to detect, after the dispensing amount calculator calculates the accumulated dispensing amount by accumulating the dispensing amount of each of the liquid chemicals to be dispensed in all of the plurality of dispensing processes, the shortages of the liquid chemicals by comparing the present amount memorized in the liquid amount memory and the accumulated dispensing amount calculated by the dispensing amount calculator.

8. An automated chemical synthesizer according to claim 1, wherein the liquid shortage detector is configured to calculate a difference by subtracting the dispensing amount calculated by the dispensing amount calculator from the present amount memorized in the liquid amount memory and configured to determine the shortages occur when the difference is smaller than zero.

9. An automated chemical synthesizer according to claim 8, wherein the synthesizing protocol comprises a plurality of dispensing processes, and wherein the liquid shortage detector is configured to detect the shortage of each of the liquid chemicals every time the dispensing amount in each of the plurality of dispensing processes is calculated.

10. An automated chemical synthesizer according to claim 1, further comprising:
    a liquid shortage prevention section configured to notify an operator that the shortage will occur when the liquid shortage detector detects the shortages.

11. An automated chemical synthesizer according to claim 1, wherein the liquid chemicals comprise at least one reagent and at least one solvent.

12. An automated chemical synthesizer according to claim 11, wherein said at least one liquid dispenser is configured to dispense the solvents and reagents to said plural reaction vessels.

13. An automated chemical synthesizer according to claim 11, wherein said at least one liquid dispenser comprises:
    a first liquid dispenser configured to dispense the reagents to said plural reaction vessels; and
    a second liquid dispenser configured to dispense the solvents to said plural reaction vessels.

14. An automated chemical synthesizer according to claim 1, wherein some of the plurality of liquid containers contain same liquid among the liquid chemicals and the at least one liquid dispenser is configured to dispense said same liquid from any one of said some of the plurality of liquid containers, and wherein the liquid shortage detector is configured to detect the shortages of said same liquid based on a total amount of said same liquid stored in all of said some of the plurality of liquid containers.

15. An automated chemical synthesizer according to claim 1, wherein the liquid shortage detector is configured to detect the shortages in all of the plurality of liquid containers.

16. An automated chemical synthesizer according to claim 1, wherein the liquid shortage detector is configured to detect the shortages in a part of the plurality of liquid containers.

17. An automated chemical synthesizer according to claim 1, wherein the liquid shortage detector is configured to detect the shortages both before and while the synthesizing protocol is carried out.

18. An automated chemical synthesizer according to claim 1, wherein the liquid shortage detector is configured to detect the shortages either before or while the synthesizing protocol is carried out.

19. An automated chemical synthesizer comprising:

plural reaction vessels;

a plurality of liquid containers for containing liquid chemicals respectively;

liquid dispensing means for dispensing the liquid chemicals from the plurality of liquid containers to said plural reaction vessels according to a synthesizing protocol;

liquid amount memory means for memorizing a present amount of each of the liquid chemicals in the plurality of liquid containers;

dispensing amount calculation means for calculating a dispensing amount of each of the liquid chemicals to be dispensed according to the synthesizing protocol; and liquid shortage detecting means for detecting shortages of the liquid chemicals in the plurality of liquid containers by comparing the present amount memorized in the liquid amount storage means and the dispensing amount calculated by the dispensing amount calculation means.

20. A liquid shortage detecting system for an automated chemical synthesizer in which at least one liquid dispenser is configured to dispense the liquid chemicals from a plurality of liquid containers to a plurality of reaction vessels according to a synthesizing protocol, the system comprising:

a liquid amount memory configured to memorize a present amount of each of the liquid chemicals in the plurality of liquid containers;

a dispensing amount calculator configured to calculate a dispensing amount of each of the liquid chemicals to be dispensed according to the synthesizing protocol; and a liquid shortage detector configured to detect shortages of the liquid chemicals in the plurality of liquid containers by comparing the present amount memorized in the liquid amount memory and the dispensing amount calculated by the dispensing amount calculator.

21. A method for detecting liquid shortages in an automated chemical synthesizer in which at least one liquid dispenser is configured to dispense the liquid chemicals from a plurality of liquid containers to a plurality of reaction vessels according to a synthesizing protocol, the method comprising:

memorizing a present amount of each of the liquid chemicals in the plurality of liquid containers;

calculating a dispensing amount of each of the liquid chemicals to be dispensed according to the synthesizing protocol; and detecting shortages of the liquid chemicals in the plurality of liquid containers by comparing the memorized present amount and the calculated dispensing amount.

* * * * *